United States Patent [19]

Beard et al.

[11] Patent Number: 5,214,732
[45] Date of Patent: May 25, 1993

[54] OPTICAL FIBER RETENTION MECHANISM FOR SECURING OPTICAL FIBER CABLE

[75] Inventors: Michael S. Beard, Eden Prairie; Curtis Puetz, Apple Valley, both of Minn.

[73] Assignee: ADC Telecommunications, Inc., Minneapolis, Minn.

[21] Appl. No.: 816,105

[22] Filed: Jan. 2, 1992

[51] Int. Cl.$^5$ .............................................. G02B 6/36
[52] U.S. Cl. ........................................ 385/78; 385/76
[58] Field of Search ...................... 385/78, 76, 62, 66, 385/69, 60, 58

[56] References Cited

U.S. PATENT DOCUMENTS

| | | | |
|---|---|---|---|
| 4,422,716 | 12/1983 | Morimoto et al. | 385/78 |
| 4,579,418 | 4/1986 | Parchet et al. | 385/78 X |
| 4,738,507 | 4/1988 | Palmquist | 385/78 |
| 4,812,009 | 3/1989 | Carlisle et al. | 385/66 X |
| 4,852,963 | 8/1989 | Lampert | 385/78 X |
| 5,082,345 | 1/1992 | Cammons et al. | 385/60 |
| 5,096,276 | 3/1992 | Gerace et al. | 385/76 |

OTHER PUBLICATIONS

A brochure of MIKON Series ST III connectors.

*Primary Examiner*—Frank Gonzalez
*Assistant Examiner*—Phan T. Heartney
*Attorney, Agent, or Firm*—Merchant, Gould, Smith, Edell, Welter & Schmidt

[57] ABSTRACT

A fiber cable retention mechanism for securing an optical fiber cable to an optical fiber connector includes a sleeve assembly having a longitudinal axis. The sleeve assembly has an inner passageway which is disposed along the axis and sized to receive the cable connecting end of the connector. The assembly is further sized to securely receive at least a portion of the cable between the assembly and the cable connecting end.

11 Claims, 3 Drawing Sheets

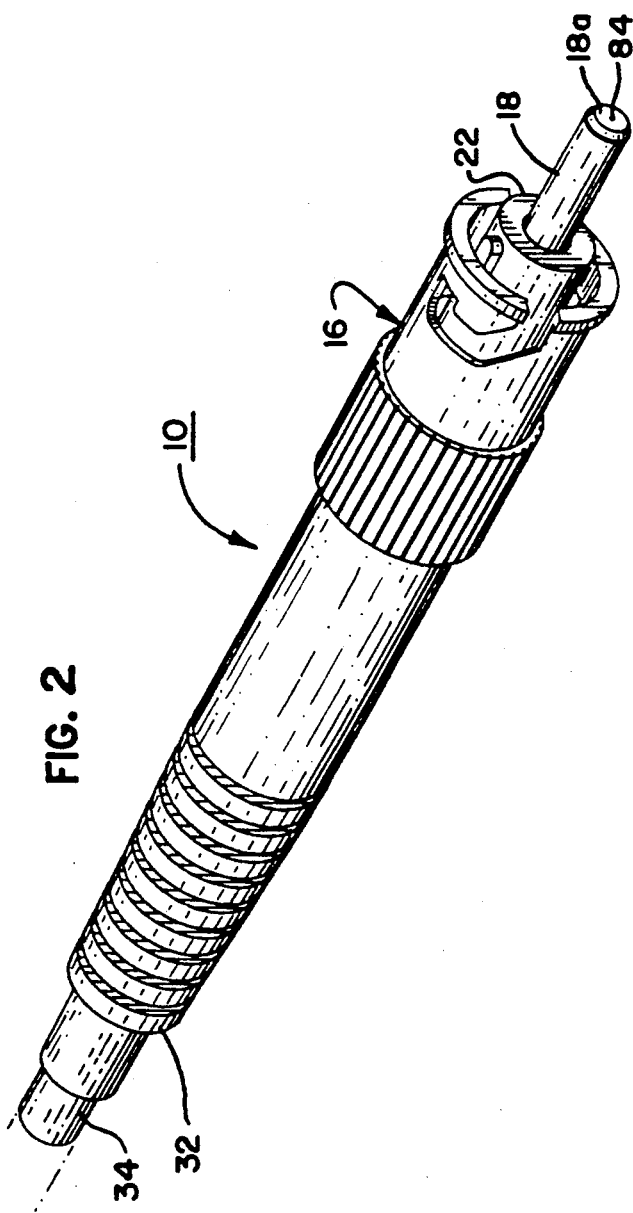
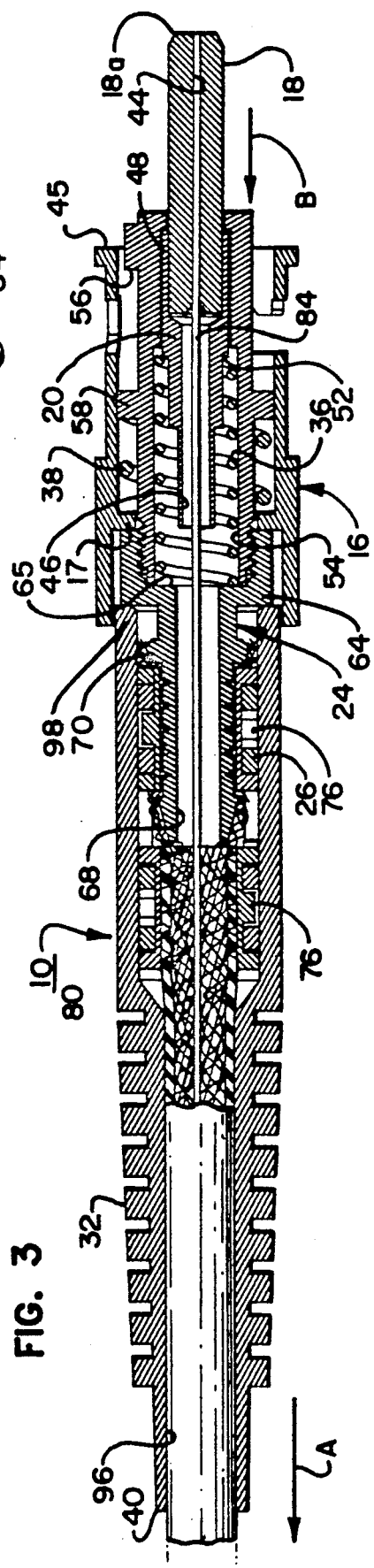
FIG. 2
FIG. 3

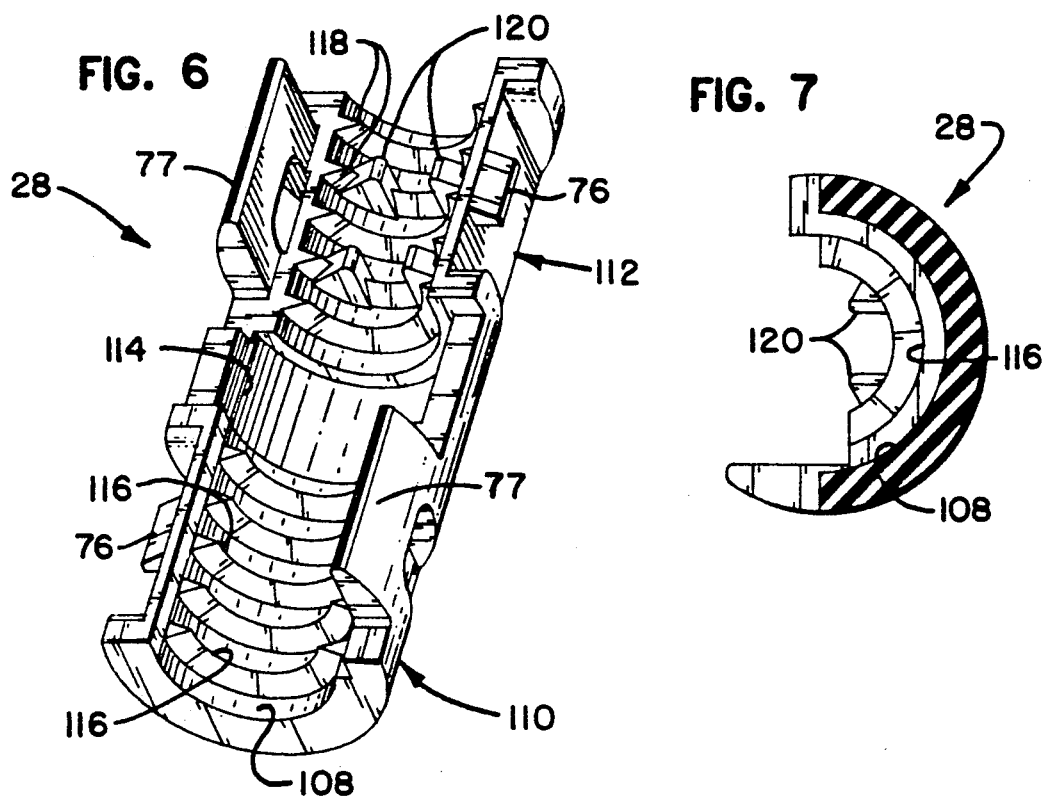
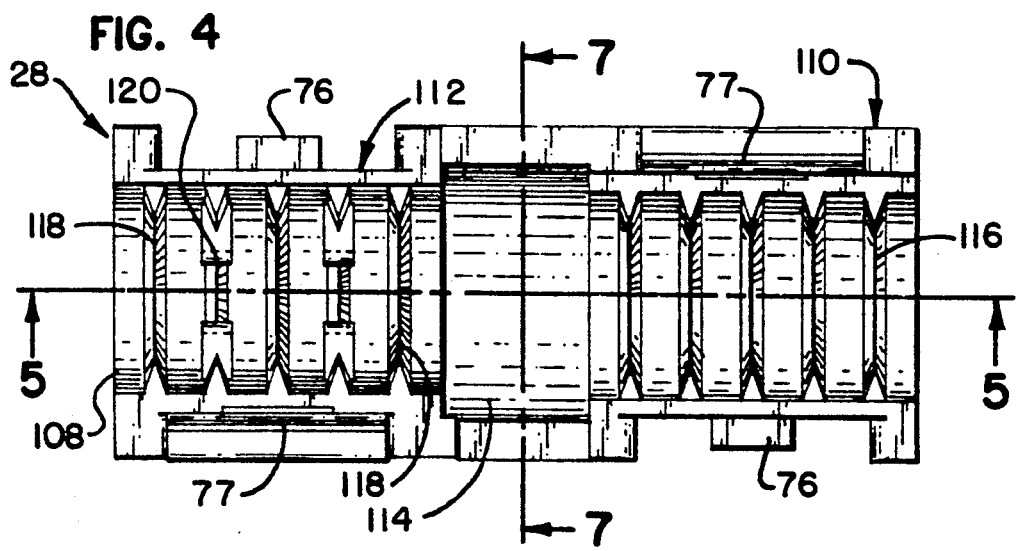
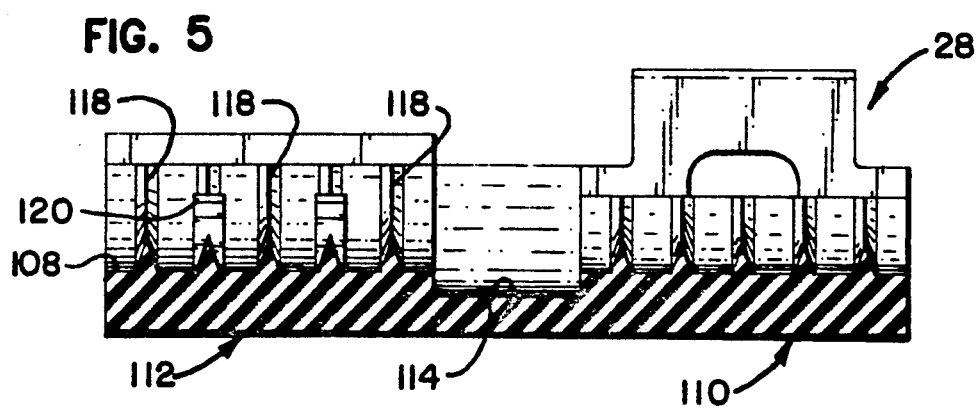

5,214,732

OPTICAL FIBER RETENTION MECHANISM FOR SECURING OPTICAL FIBER CABLE

CROSS-REFERENCE TO RELATED APPLICATION

This application discloses subject matter which is disclosed and claimed in our copending and commonly assigned U.S. patent application Ser. No. 07/816,743 filing date Jan. 2, 1992, filed concurrently herewith and entitled "Fiber Optic Connector."

BACKGROUND OF THE INVENTION

1. Field of the Invention

This invention pertains to fiber optic connectors for use in optical fiber signal transmission systems. More particularly, this invention pertains to a retention mechanism for securing an optical fiber cable to a connecting end of an optical fiber connector.

2. Description of the Prior Art

Optical fiber connectors are used to couple optically one optical fiber to another optical fiber or to an optical device. Such connectors are an important part of any optical fiber transmission system and the industry has expended substantial effort in their development. A commonly available optical connector is referred to as an ST connector (ST is a registered trademark of AT&T). An example of a type of an ST connector is shown in U.S. Pat. No. 4,812,009 dated Mar. 14, 1989.

In installation and use, an optical fiber connector experiences disruptive forces from time to time. For example, axial loads may be applied to a connector. The axial load may result from a person inadvertently pulling on a cable which is attached to the connector. It is necessary to provide a retention mechanism for securely fastening a fiber cable to the connector end of an optical fiber connector.

SUMMARY OF THE INVENTION

According to a preferred embodiment of the present invention, a fiber cable retention mechanism is disclosed for securing an optical fiber cable to a cable connecting end of an optical fiber connector. The retention mechanism includes a sleeve assembly having a longitudinal axis and defining an inner passageway disposed along the axis. The inner passageway is sized to receive the connecting end. Further, the inner passageway is sized to securely receive at least a portion of the cable between the assembly and the connecting end.

BRIEF DESCRIPTION OF THE DRAWINGS

FIG. 2 is a perspective assembled view of the connector of FIG. 1;

FIG. 3 is a cross sectional view taken along a longitudinal axis of the connector assembly of FIG. 1;

FIG. 4 is a top plan view of one mating half of the retention mechanism of the present invention;

FIG. 5 is a side sectional view of the mating half of FIG. 4 is taken along line 6—6;

FIG. 6 is a perspective view of the mating half of FIG. 4; and

FIG. 7 is a view taken along line 7—7 of FIG. 4.

DESCRIPTION OF THE PREFERRED EMBODIMENT

Figure 1:
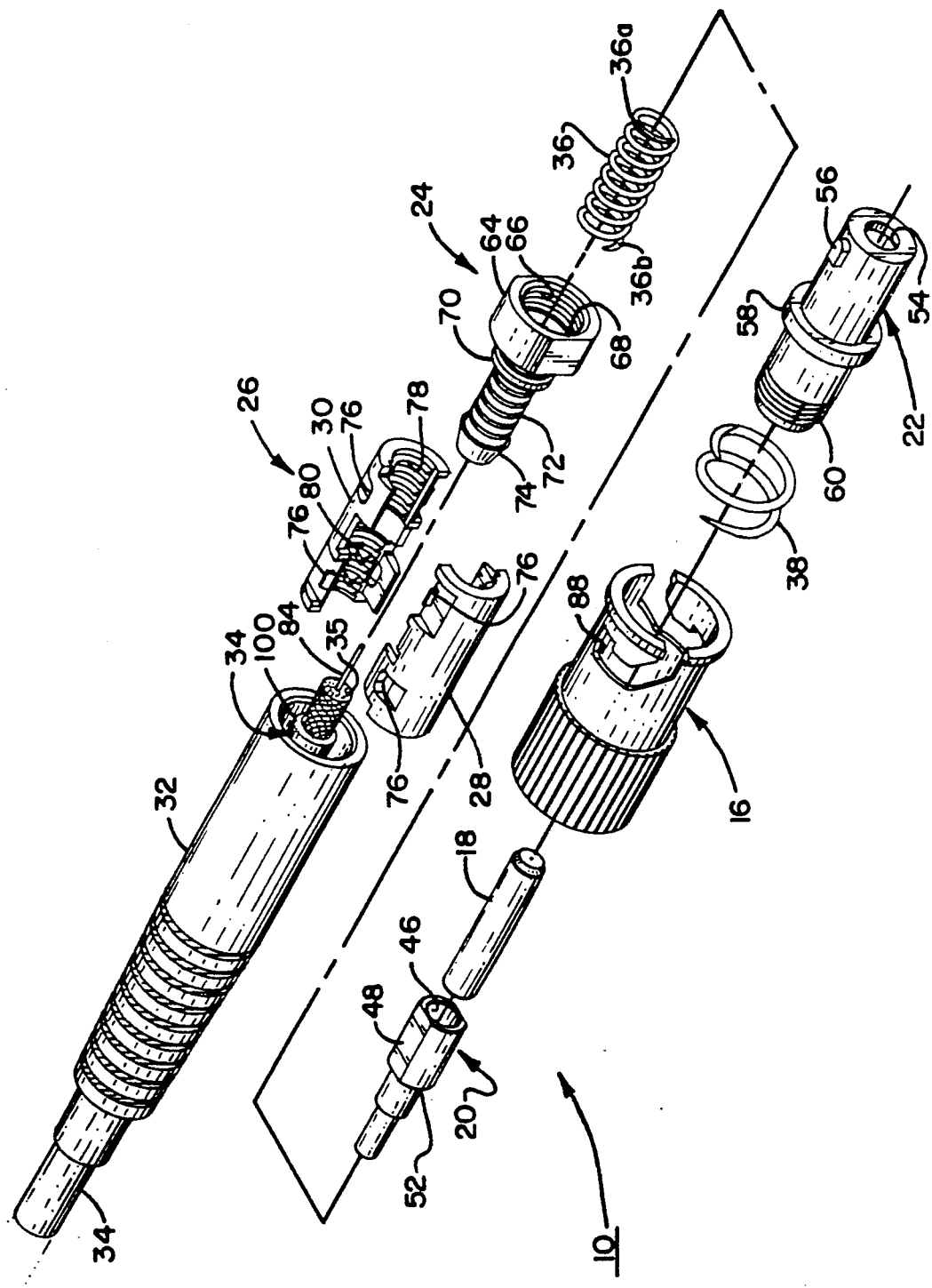
FIG. 1 is an exploded perspective view of a connector including a retention mechanism according to the present invention.

Referring now to the drawing figures in which similar elements are numbered identically throughout, a description of the preferred embodiment of the present invention will now be provided.

With initial reference to FIG. 3, a connector assembly 10 is shown for connection to an adapter (not shown). The adapter is commercially available and includes two BNC connector ends. Such an adapter is shown in U.S. Pat. No. 4,812,009 (item 90 in FIG. 2).

The connector 10 is shown in exploded perspective format in FIG. 1. The connector 10 includes a nut coupling 16, a ferrule 18 and a hub 20. Connector 10 also includes a barrel or housing 22, a retaining shell 24 and a retention mechanism or retaining clip 26 in the form of mating halves 28,30. Finally, a strain relief boot 32 is provided to give strain relief to a cable 34 secured to connector 10. An inner spring 36 and an outer spring 38 are provided to complete the construction of connector assembly 10.

With reference now to FIG. 3, the connector 10 is shown in longitudinal cross section extending from a cable entrance end 40 to an opposite or termination end 45.

The ferrule 18 is cylindrical and includes an axially extending bore 44 extending through ferrule 18. Hub 20 is also cylindrical and has an axially extending bore 46. The hub 20 includes an attachment end 48 at which bore 46 is enlarged such that ferrule 18 may be press fit within hub 20 and with ferrule bore 44 axially aligned with hub bore 46. The hub 20 has an exterior diameter which is reduced in dimension at an intermediate location. The reduced diameter portion results in the definition of an annular wall 52 facing the cable entrance end 40.

The barrel or housing 22 is also generally cylindrical and includes an axially bore 54 extending therethrough. Axial bore 54 is sized to receive the ferrule 18 and hub 20 to permit the ferrule 18 and hub 20 to axially slidable within bore 54. A key 56 is disposed on the exterior surface of housing 22. The key 56 aligns with a keyway of an adapter (not shown). An annular ring 58 is provided on an intermediate portion of housing 22. An end of housing 22 opposing cable entrance end 40 is provided with external threads 60.

The retaining shell 24 has a hub portion 64 with internal threads 66 sized to be received on external threads 60 of barrel housing 22. The retaining shell 24 also has an interior axial bore 68. Bore 68 is aligned with bores 46 and 44 when threads 66 are threadially engaging threads 60 as shown in FIG. 3.

Spaced from hub 64, an annular ring 70 surrounds shell 24. Shell 24 has a grooved surface 72 which extends from ring 70 to a terminal end 74.

The internal spring 36 is provided surrounding hub 20 and having a first end 36a abutting surface 52. A second end 36b abuts an annular wall 65 of hub 64. As hub 64 is threaded onto thread 60, spring 36 is partially compressed to urge hub 20 and ferrule 18 away from cable entrance end 40.

A nut 16 surrounds the housing 22. The nut 16 is similar to item 72 in the aforementioned U.S. Pat. No. 4,812,009. Hub 16 includes a groove 88 to permit attachment to BNC pins of an adapter (not shown). It will be appreciated that nuts such as nut 16 for adaption to a BNC connector form no part of this invention per se.

The nut 16 includes an inwardly projecting radial flange 17. External spring 38 is disposed between ring 58 and flange 17.

The strain relief boot 32 has a bore 96 sized to receive cable 34. The boot terminates at an inner end 98 sized to be received over ring 70 and captured on ring 70.

The cable 34 is a common commercially available fiber optic cable. The cable includes an outer jacket 100 and an optical fiber 84. Kevlar fibrous reinforcement 35 surrounds the fiber 84 with the jacket 100 surrounding the fibers 35. The fibers are yarn-like strength members.

The retaining shell 24 has a cable connecting end 102 having a plurality of annular grooves formed therein. The shell 24 terminates at an enlargement 74.

The retaining clip 26 includes first and second mating halves 28,30. The halves 28,30 are snap fit together by cooperating male and female snapping locks 76,77, respectively. Mating half 28 is shown in FIGS. 4 through 7. It will be appreciated that mating half 30 is substantially identical. Accordingly, a description of half 28 will suffice as a description of mating half 30.

The mating half 28 is generally semi-cylindrical and includes an arcuate inner surface 108. The mating half 28 includes a first portion 110 and a second portion 112 divided by a channel 114. The channel 114 is so disposed such that the halves 28,30 may be joined together with enlargement 74 received within channel 114 (as shown in FIG. 3). The inner surface 108 is sized such that when mating halves 28,30 are joined together by snap fit of male and female fasteners 76,77, shell 24 is received within first half 110. First half 110 includes inwardly projecting annular ribs in the form of arcuate rib segments 116. The arcuate rib sections 116 are sized to extend into the annular grooves 104 when retention mechanism 26 is snap fit onto shell 24.

Second portion 112 also includes arcuate rib segments 118 as well as inwardly protruding gripping members 120. The ribs 118 and gripping members 120 are sized to protrude into the flexible jacket 100 of cable 34 when cable 34 is received within mechanism 26 and disposed between portions 112 of halves 28,30. The gripping members 120 also protrude into the sheath material of jacket 100 to securely capture and affix the sheath 100 to member 24. Also, the Kevlar fibers extend between member 24 and first portions 110. Accordingly, ribs 116 force the Kevlar fibers into grooves 104 to securely affix the Kevlar reinforcement fibers to member 24. As a result, both the jacket 100 and the Kevlar fibers 35 are separately and independently affixed to the retaining shell 24.

The ribs 116,118 may be sized differently to accommodate different materials and gripping requirements for the sheathing 100 and the Kevlar 35. An alternative embodiment of the design is to have the ribs 118,116 identically sized and to omit the requirement of the gripping member 120. With such a design, mating halves 28,30 may be completely interchangeable and rotatable relative to one another before snapping the halves 28,30 together. This provides for ease of assembly.

The foregoing detailed description of the present invention has been shown how the objects of the invention have been attained in a preferred manner. However, modifications and equivalents of the disclosed concepts are intended to be included within the scope of the present invention.

What is claimed is:

1. A fiber cable retention mechanism for securing an optical fiber cable to a cable connecting end of an optical fiber connector having an optical fiber termination end opposite the cable connecting end, said retention mechanism comprising:

a sleeve assembly having a longitudinal axis and defining an inner passageway disposed along said axis and sized to securely receive said cable connecting end therein and further sized to securely receive at least a portion of said cable between said assembly and said cable connecting end, said sleeve assembly further includes first and second opposing sleeve members, said sleeve members each having an inner arcuate surface cooperating to define said passageway upon assembly of said sleeve members and said sleeve members including means for connecting said first sleeve member to said second sleeve member.

2. A fiber cable retention mechanism according to claim 1 wherein said connecting means includes at least one male and one female fastening portion integrally formed on each of said sleeve members such that the female portion of each sleeve member engages the male portion of the other sleeve member to lock the sleeve members together wherein said inner arcuate surfaces of the sleeve members enclose said annular passageway of the sleeve assembly.

3. A fiber cable retention mechanism according to claim 2 wherein said male fastening portion includes a locking ramp and said female fastening portion includes an extending flange having a slot adapted for receiving said locking ramp.

4. A fiber cable retention mechanism according to claim 2 wherein said first and second sleeve members each include an even number of male and female fastening portions positioned along the outer surface of the sleeve member such that the two sleeve members are connectable in any opposing longitudinal orientation.

5. A fiber cable retention mechanism according to claim 1 wherein said assembly includes arcuate rib segments extending radially inward into said passageway with said segments sized to securely engage an outer surface of said cable and said segments adapted to be received in grooves in said connecting end with a portion of said cable securely disposed between said assembly and connecting end.

6. A fiber cable retention mechanism as defined in claim 1 wherein said second sleeve member is shaped identical to said first sleeve member to make the sleeve members interchangeable.

7. A fiber cable retention mechanism as defined in claim 6 wherein said inner arcuate surfaces of the sleeve members include arcuate rib segments extending radially inwardly into said passageway and sized to contact and compress the outer jacket of a fiber cable disposed in said passageway such that the fiber cable is prevented from moving longitudinally with respect to the sleeve assembly.

8. A fiber cable retention mechanism for securing an end of an optical fiber cable having an outer jacket, yarn-like strength members, and an optical fiber to an optical fiber connector having a generally cylindrical cable connecting end portion, said end portion having an axially-extending hole therethrough for receiving the optical fiber, said connector having an optical fiber termination end opposite the cable connecting end portion, said retention mechanism comprising:

a sleeve assembly having a longitudinal axis, said assembly having first and second opposing sleeve members, said sleeve members each having an inner arcuate surface cooperating to define a passageway through said assembly sized to receive said cable connecting end portion, said assembly further including means for connecting said first sleeve member to said second sleeve member to securely retain an end of said cable and the cable connector end portion within said inner passageway of the sleeve assembly.

9. A fiber cable retention mechanism according to claim 8 wherein said connecting means includes at least one male and one female fastening portion integrally formed on each of said sleeve members such that the female portion of each sleeve member engages the male portion of the other sleeve member to lock the sleeve members together such that said inner arcuate surfaces of the sleeve members enclose the cable end and the connector end portion disposed within said annular passageway of the sleeve assembly.

10. A fiber cable retention mechanism as defined in claim 8 wherein said end portion is provided with annular grooves of predetermined dimension therein and said inner arcuate surface of the sleeve members includes arcuate rib segments extending annularly inwardly and positioned at spaced intervals such that when the yarn-like strength members of the fiber cable are disposed about an outer surface of said annular grooves, said rib segments of the sleeve members are received in said grooves with the cable strength members compressed between said ribs and grooves to prevent longitudinal movement of the fiber cable and the connector end portion with respect to the sleeve assembly.

11. A fiber cable retention mechanism according to claim 8 wherein said cylindrical end portion includes a surface enlargement and wherein said inner arcuate surfaces of the sleeve members include a channel adapted for receiving said enlargement to retain the connector end portion within the sleeve assembly.

* * * * *